United States Patent Office 3,076,775

Patented Feb. 5, 1963

3,076,775

CYCLOALKANONETETRAESTERS AND VINYL CHLORIDE RESINS CONTAINING SAME

James E. Masterson, Moorestown, and Arthur W. Ritter, Jr., Haddon Heights, N.J., and Richard F. Conyne, Andalusia, Pa., assignors to Rohm & Haas Company, Philadelphia, Pa., a corporation of Delaware No Drawing. Filed May 18, 1960, Ser. No. 29,776
17 Claims. (Cl. 260—31.8)

The invention concerns a class of cycloalkanonetetraesters and the resinous compositions plasticized therewith.

Well-known plasticizers, such as di(2-ethylhexyl)-phthalate, are no longer fully adequate to satisfy the demanding and exacting conditions to which plasticized resinous products are subjected under modern usage. An important requirement is that the plasticizers, in addition to their compatibility, possess good permanence with the resin; another important property is that the plasticized resins have good electrical insulation. In accordance with the invention, there are provided a class of compounds, which are very good plasticizers containing very desirable properties.

The cycloalkanonetetraesters of the invention have the formula

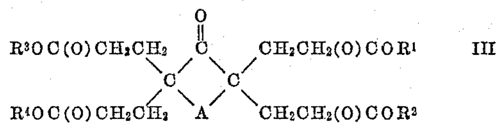

wherein A is a divalent saturated aliphatic hydrocarbon group containing an alkylene chain of 2 to 3 carbon atoms and said group containing a maximum of 12 carbon atoms in addition to the carbon atoms of the alkylene group.

The substituents $R^{1\text{ to }4}$ contain an average carbon content of 4 to 10 carbon atoms, it being provided that all R substituents are the same or different. Accordingly, all R substituents may contain each from 4 to 10 carbon atoms or some R substituents may contain less than 4 carbon atoms while the average carbon content of all R substituents will range from 4 to 10 carbons.

Typical alkyl substituents which the $R^1$, $R^2$, $R^3$, and $R^4$ groups represent are: methyl, butyl, pentyl, isopentyl, isobutyl, isohexyl, octyl, 2,3-dimethylbutyl, 2-methylpentyl, 2,2-dimethylbutyl, n-heptyl, 2,2-dimethylpentyl, 2,4-dimethylpentyl, n-octyl, 2-ethylhexyl, decyl, isodecyl, 5-methylheptyl, and the like.

The group A is a saturated aliphatic hydrocarbon group which contains an alkylene chain of 2 to 3 carbon atoms, which may be substituted with one or more alkyl, including cycloalkyl, groups on any or all of the carbon atoms of the alkylene chain. Preferably, the total carbon atom content of the alkyl substituents on the alkylene chain does not exceed 12 carbon atoms. Typical alkyl groups include those listed for the R substituents above and also cyclohexyl, cyclopentyl, dodecyl, and the like. When these esters are employed as plasticizers, particularly as primary plasticizers, best results are obtained when the total carbon content of the R substituents and the carbon atoms of the hydrocarbon group other than those of the alkylene chain do not exceed 40 carbon atoms. Amongst these esters, those which are fluid at 35° C. are preferred.

Typical of the esters of the invention are dimethyl didecyl cyclohexanonetetrapropionate
ethyl-tri-2-(ethylhexyl)-cyclohexanonetetrapropionate
5-isononyltetra(isoheptyl)cyclohexanonetetrapropionate tetra(isobutyl)cyclohexanonetetrapropionate
tetra(isoamyl)cyclohexanonetetrapropionate
tetra(butyl)cyclopentanonetetrapropionate
tetra(hexyl)cyclopentanonetetrapropionate
tetra(isooctyl)cyclopentanonetetrapropionate
tetra(butyl)cyclohexanonetetrapropionate
tetra(isopentyl)cyclohexanonetetrapropionate
tetra(isohexyl)cyclohexanonetetrapropionate
tetra(octyl)cyclohexanonetetrapropionate
tetra(decyl)cyclohexanonetetrapropionate
tetra(2-ethylbutyl)cyclohexanonetetrapropionate
tetra(isooctyl)-4-methylcyclohexanonetetrapropionate
tetra(isooctyl)-4-cyclohexyl-cyclohexanonetetrapropionate
tetra(isohexyl)-5-t-butylcyclohexanone-tetrapropionate
tetra(isohexyl)-5,5-dimethylcyclohexanonetetrapropionate
tetra(isohexyl)-4,5-dimethylcyclohexanonetetrapropionate
tetra(hexyl)-5-t-amylcyclohexanonetetrapropionate
tetra(octyl)-5-cyclohexylcyclohexanonetetrapropionate
tetra(octyl)-4,5,6-trimethyl-cyclohexanonetetrapropionate
tetra(2-ethylhexyl)-5-t-octylcyclohexanonetetrapropionate
tetra(2-methyloctyl)cyclopentanonetetrapropionate
tetra(isohexyl)-4-methylcyclopentanonetetrapropionate
di(2-ethylhexyl)-di(isobutyl)-cyclohexanonetetrapropionate
tri(isopentyl)-oxo-octylcyclopentanonetetrapropionate
tri(decyl)-2-ethylbutylcyclohexanonetetrapropionate
di(oxodecyl)-di(hexyl)cyclohexanonetetrapropionate and the like.

The cycloalkanonetetraesters of the invention are compounds which form a limited class of compounds which, unlike other related derivatives and related esters, are excellent plasticizers for polyvinyl halide resins. They possess a high degree of permanence in the resin combined with the property of imparting high electrical resistance thereto. Unexpectedly, other cycloalkanonetetraesters, like the isopropyl, the ethyl, the benzyl, or the dodecyl are unsatisfactory plasticizers.

The cycloalkanonetetraesters of the invention are obtainable by a number of methods. A convenient preparation is by esterification of the selected cycloalkanonetetrapropionic acids with the suitable alcohols. The esterification is conveniently effectuated by heating the acid with at least one alcohol at a temperature range of about 100° to 250° C., preferably at reflux. For completeness of reaction, four moles of the alcohol or the mixture thereof are employed with each mole of the cyclic acid. Conveniently, an excess of the stoichiometric amount, such as an excess of 10 to 100 mole percent, may be employed. If desired, an esterification catalyst, such as sulfuric or p-toluenesulfonic acids, may be used and optionally a water entrainer may be employed to promote the removal of water formed during the esterification. Such a water entrainer may be a lower boiling, inert solvent. When water evolution ceases, esterification is substantially completed and excess alcohol is stripped off under vacuum. The esters are obtained in good yields. The alcohols may be employed singly or in mixtures of alcohols having the same carbon content or not. The alcohols may be straight or branched chain alcohols, mixtures of such branched chain alcohols being obtainable from the "oxo" process. The acids with which these alcohols are reacted are ketocycloalkanetetrapropionic acids, such as cyclopentanonetetrapropionic acid, cyclohexanonetetrapropionic acid, p-tert-amylcyclohexanonetetrapropionic acid, p-tert-octylcyclohexanonetetrapropionic acid, and p-methylcyclohexanonetetrapropionic acid, and the like.

In the context of this invention, the term "oxo" refers to tetrapropionate esters in which the alcohols are mixtures, principally of the branched type, which are derived from the "oxo" process and containing the average carbon content that is indicated in the naming of the ester.

The following examples illustrate the method for preparing these compounds; they are not intended to be construed as limiting the invention in spirit or in scope. Amounts are given in parts by weight.

EXAMPLE 1

To a 500 ml. reaction flask is charged 2-oxo-1,1,3,3-cyclohexanetetrapropionic acid, 24.1 parts, 0.0625 mole, and 2-ethylhexyl alcohol, 130 parts, 1.0 mole. Toluene, 50 ml. is added as an entraining agent, and 0.5 part p-toluenesulfonic acid is added as an esterification catalyst. This mixture is stirred at reflux for 4.5 hours, during which toluene-water azeotrope is removed. The theoretical quantity of water (4.5 ml., 0.25 mole) is separated. The organic layer is washed, first with aqueous sodium carbonate, then with oxalic acid. Excess alcohol is distilled off to give 51.1 grams of tetraoctyl 2-oxo-1,1,3,3-cyclohexanetetrapropionate.

Analysis for $C_{50}H_{90}O_9$: carbon 71.7% (theoretical 71.8%), hydrogen 10.63% (theoretical 10.8%), and nitrogen 0.09%. The product has a molecular weight of 835 (theory), 838±1 (found).

| | |
|---|---|
| Viscosity (Gardner-Holdt) | N– |
| Color (Gardner scale) | 1– |

Likewise, 237 parts of decyl alcohol are reacted with 100 parts of 4-methylcyclohexanonetetrapropionic acid by heating in the range of about 150° to 180° C. in the presence of toluene. The product is tetra(decyl)-4-methylcyclohexanonetetrapropionate.

EXAMPLE 2

780 parts of octyl alcohol are reacted with 386 parts of cyclohexanonetetrapropionic acid at a temperature in the range of 100° to 200° C. to yield tetraoctyl-2-oxo-1,1,3,3-cyclohexanonetetrapropionate. The product is purified in accordance with the procedure of Example 1.

EXAMPLE 3

930 parts of isodecyl alcohol are reacted with 372 parts of cyclopentanonetetrapropionic acid by heating in the range of 100° to 230° C. with toluene as a solvent. Excess alcohol is stripped off and there is collected tetra-isodecyl-2-oxo-1,1,3,3-cyclohexanonetetrapropionate.

EXAMPLE 4

570 parts of 2-ethylbutyl alcohol are heated with 499 parts of 5-t-octylcyclohexanonetetrapropionic acid in the range of 100° to 200° C. The product is tetra(2-ethylbutyl)-5-t-octyl-cyclohexanonetetrapropionate.

The other esters of the invention are made following the same procedural steps with substitution of the desired alcohol and acid as desired.

The cycloalkanonetetraesters of the invention are useful plasticizers for vinyl halide resins. The term "vinyl halide resin" refers herein to polymers containing a predominant quantity, that is, a quantity greater than 50%, generally over 60%, of the monomer as vinyl halide units. This includes the homopolymers of the vinyl halides as well as the copolymers and interpolymers prepared therefrom. Other monomers that may be copolymerized with the vinyl halide include the vinyl type monomers such as, for example, those having a single vinylidene or a vinyl group, such as vinylidene chloride, vinyl chloroacetate, chlorostyrene; chlorobutadienes, etc., and those copolymers of such vinyl compounds and other unsaturated materials copolymerizable therewith, for example, copolymers of a vinyl halide, such as vinyl chloride, with such materials as vinylidene chloride, vinyl esters of carboxylic acids, for example, vinyl acetate, vinyl propionate, vinyl butyrate, vinyl benzoate; esters of unsaturated acids, for example, alkyl acrylates, such as methyl acrylate, ethyl acrylate, propyl acrylate, butyl acrylate, allyl acrylate, and the corresponding esters of methacrylic acid; vinyl aromatic compounds, for example, styrene; esters of $\alpha,\beta$-unsaturated carboxylic acids, for example, the methyl, ethyl, butyl, amyl, hexyl, octyl esters of maleic, crotonic, itaconic fumaric acids and the like. Further useful copolymers are those obtained by copolymerization of vinyl chloride with an ester of an $\alpha,\beta$-unsaturated dicarboxylic acid, such as diethyl maleate or other esters of maleic, fumaric, aconitic, itaconic acid, etc., in which 5 to 20 parts by weight of diethyl maleate or other analogous esters are used for every 95 to 80 parts by weight of vinyl chloride.

The esters of the invention are ordinarily incorporated into the vinyl halide polymers by mixing the powdered resin with the liquid plasticizer followed by mixing and/or kneading and then by curing the mix at an elevated temperature, for example, within the range from 150° to 200° C., on hot rolls or in a heated mixer, such as a Werner-Pfleider or Banbury mixer. The proportion of ester that may be employed may vary over a great range since it is dependent on the particular esters of this invention which are selected, the specific polyvinyl halide resin to be plasticized and the final degree of plasticization desired in the resin, this factor in itself being dependent on the ultimate application intended for the resin. With these facts in mind, one skilled in the art will use the esters in a "plasticizing amount," for most purposes this being from about 20 to 90 parts, and more specifically from 30 to 60 parts, of ester per 100 parts of resin. In amounts less than 20 parts per 100 parts of resin, the effect of selected ester may be noted; in amounts exceeding 100 parts of ester per 100 parts of polyvinyl chloride resin, the esters of the invention are more commonly suitable for use in organosols and plastisols.

In accordance with the invention, there may be employed one or more esters of this invention in polyvinyl halide compositions; also, the esters of the invention may be employed as the sole plasticizer; or they may be employed in conjunction with conventional plasticizers, such as alkyl phthalates, alkyl phosphates, monomeric or polymeric epoxides, and other plasticizers known in the art. Optionally, the resinous compositions may have incorporated therewith various stabilizers, fillers, dyes, pigments, and the like.

In the following sections, the value of the esters as plasticizers is illustrated by incorporating selected esters of the invention into the following standard and electrical formulations:

*Table I*

RESINOUS FORMULATIONS

| Composition | A | B |
|---|---|---|
| Ingredients | Standard | Electrical |
| Polyvinyl chloride | 60 | 65 |
| Ester Tested | 40 | 35 |
| Coprecipitated Barium-Cadmium Salt (stabilizer) | 1 | |
| Tribasic lead sulfate (stabilizer) | | 5 |
| Clay (filler) | | 15 |
| Wax (lubricant) | | 0.3 |

The plasticizing esters of the invention and the other ingredients are incorporated with powdered vinyl chloride polymer and compounded on differential speed rolls. The compositions are individually fluxed and milled on a roller mill at 325° F. until they are uniform. They are then sheeted off the mill at a thickness of 10 mils and slabs of an approximate thickness of 100 mils are molded for use in Test 5.

The results of evaluation tests carried out with the compounds and the resin samples listed in Table II are shown below:

*Table II*

| Esters: | Resin sample |
|---|---|
| Tetra(2-ethylbutyl)cyclohexanonetetrapropionate | 1 |
| Tetra(decyl)cyclopentanonetetrapropionate | 2 |
| Tetra(isooctyl)cyclopentanonetetrapropionate | 3 |
| Tetra(isooctyl)cyclohexanonetetrapropionate | 4 |
| Tetra(2-ethylbutyl)5-t-octylcyclohexanonetetrapropionate | 5 |
| Tetra(isohexyl)cyclohexanonetetrapropionate | 6 |
| Di(2-ethylhexyl)phthalate | 7 |

The resin samples are evaluated in accordance with the following tests:

EVALUATION TESTS

*Test 1*

*Activated carbon volatility.*—Individual specimens of equal thickness are placed between 2" layers of activated carbon in sealed glass jars which are maintained at 90° C. for 24 hours. The specimens are removed, dusted free of carbon and re-weighed. The percent loss in weight is a measure of the amount of plasticizer which has been adsorbed by the carbon.

*Test 2*

*Gasoline extraction.*—Weighed samples are immersed in white, lead-free gasoline at 25° C. for 60 minutes, after which they are thoroughly dried and re-weighed.

*Test 3*

*Soapy water extraction.*—Weighed samples are immersed in a 1% aqueous solution of Ivory soap at 60° C. for 24 hours, after which they are thorouhgly dried and re-weighed.

*Test 4*

*Quantitative compatibility.*—Samples are placed between two sheets of cardboard which have been conditioned for at least 15 hours. The cardboard-specimen sandwiches are placed between 5-inch x 5-inch x 1-inch woodblocks under a 3-kilogram weight. After seven days, the specimens are removed from the stack, conditioned, and re-weighed. The cardboard sheets are examined qualitatively for evidence of plasticizer, and percent plasticizer lost is calculated.

*Test 5*

*Electrical properties.*—Electrical properties of the compositions of this invention are tested by determinations of volume resistivity. Volume resistivity has been shown to have excellent correlation with insulation resistance. The tests are carried out on a specimen of the resinous compositions, molded into a standard 4 cavity A.S.T.M. mold to give specimens of 6" x 6" x approximately 0.075". Silver lacquer-painted electrodes were centered on and attached to both sides of the molded slab. A Keithley vacuum tube electrometer, Model 200, a Keithley decade shunt and a direct current power supply were then used to determine the resistance of the sample. The procedure is further described in "Rubber Age," pages 105 to 108, April 1956, C. E. Balmer and R. F. Conyne, and in "Rohm & Haas Company"—"Resin Review," pages 3 to 9, vol. 6, No. 1.

The electrical properties in terms of insulation resistance are tested by subjecting the standard specimens to a significant number of volume resistivity tests. The samples are tested to temperatures of (*a*) 90° C.

(*b*) 60° C. immediately after immersion for 20 hours in water heated at 60° C.

*Table III*

| Tests | Samples | | | | | | |
|---|---|---|---|---|---|---|---|
| | 1 | 2 | 3 | 4 | 5 | 6 | 7 |
| Activated Carbon Volatility | 0.3 | 0.8 | 0.6 | 0.6 | 0.4 | 0.6 | 10.3 |
| Soap Extraction | 0 | 1 | 0 | 0 | 0 | 0 | 9.6 |
| Hexane Extraction | 15 | 36 | 32 | 32 | 27 | 19 | 31 |
| Quantitative Compatibility | 0 | .04 | 0.03 | 0 | 0.06 | 0 | 0.13 |

The data show the severe lack of permanence of DOP in the resin; it volatilizes readily and shows serious losses when subjected to water and soap, a very common environmental hazard. In contrast, typical cycloalkanonetetrapropionates possess a high resistance to volatilization, excellent stability to soapy water extraction combined with a retention or improvement of resistance to hexane extraction. Also, the compounds are very compatible with the resin stock forming clear and supple films.

*Table IV*

ELECTRICAL INSULATION PROPERTIES

| Tests | Samples | | | |
|---|---|---|---|---|
| | 1 | 2 | 4 | 6 |
| Volume Resistivity (ohms-cms.$\times 10^{12}$): | | | | |
| 90° C., dry | 1.8 | 2.7 | 2.1 | 1.0 |
| 60° C., wet | 1.3 | 5.4 | 1.9 | 1.8 |

The data show that cycloalkanonetetrapropionates of the invention possess high electrical insulation properties. The excellent compatibility with the high permanence of these esters in the polyvinyl chloride stock allied with high electrical insulation is a combination of valuable properties.

In the standard formulation, there are incorporated 20 parts of tetra(2-ethylbutyl)cyclohexanonetetrapropionate and 20 parts of tetra(decyl)cyclopentanonetetrapropionate. The resin is supple, pliable and the plasticizers show good permanence in the resin. The soap extraction is practically nil. When formulated in an electrical formulation, good electrical insulation is imparted to the resin.

Tetra(2-ethylbutyl)cyclohexanonetetrapropionate, tetra(isooctyl)cyclopentanonetetrapropionate, and tetra(2-ethylbutyl)-4-t-octylcyclohexanonetetrapropionate are incorporated individually into polyvinyl chloride copolymer resinous compositions identical to the standard and the electrical formulations, except that polyvinyl chloride is replaced by copolymers of (*c*) Vinyl chloride, 87 parts, and vinyl acetate, 13 parts;

(*d*) Vinyl chloride, 80 parts, and vinylidene chloride, 20 parts;

(*e*) Vinyl chloride, 80 parts, and methyl acrylate, 20 parts;

(*f*) Vinyl chloride, 95 parts, and vinyl isobutyl ether, 5 parts.

In all resinous compositions, there are noted improved performance over DOP plasticized resinous compositions, particularly with respect to permanence properties and electrical resistivity.

When there are incorporated into 65 parts of polyvinyl chloride, 35 parts of the ester, tetra(2-ethylbutyl)cyclohexanonetetrapropionate, the resulting resinous composition has improved permanence and electrical properties over resinous compositions plasticized with DOP.

Similar improved compositions are obtained with tetra(decyl)cyclopentanonetetrapropionate, tetra(isooctyl)cyclohexanonetetrapropionate, and tetra(2-ethylbutyl)-5-t-octylcyclohexanonetetrapropionate.

We claim:

1. An ester of the formula $$\begin{array}{ccccc} & & \overset{O}{\underset{}{\|}} & & \\ R^3OC(O)CH_2CH_2 & & C & & CH_2CH_2(O)COR^1 \\ & \diagdown & \diagup\ \diagdown & \diagup & \\ & C & & C & \\ & \diagup & \diagdown\ \diagup & \diagdown & \\ R^4OC(O)CH_2CH_2 & & A & & CH_2CH_2(O)COR^2 \end{array}$$

wherein A is selected from the group consisting of an alkylene chain of 2 to 3 carbon atoms and an alkylene chain of 2 to 3 carbon atoms substituted with at least one alkyl group, of 1 to 12 carbon atoms, and $R^1$ to $R^4$ are alkyl groups containing an average carbon atom content of 4 to 10 carbon atoms, with the proviso that the sum of the carbon atoms of $R^1$ to $R^4$ plus the number of carbon atom in the alkyl group substituted on the alkylene chain does not exceed 40 carbon atoms.

2. The esters of the formula of claim 1 which are fluid at 35° C.

3. An ester of the formula $$\begin{array}{ccccc} & & \overset{O}{\underset{}{\|}} & & \\ R^3OC(O)CH_2CH_2 & & C & & CH_2CH_2(O)COR^1 \\ & \diagdown & \diagup\ \diagdown & \diagup & \\ & C & & C & \\ & \diagup & \diagdown\ \diagup & \diagdown & \\ R^4OC(O)CH_2CH_2 & & A & & CH_2CH_2(O)COR^2 \end{array}$$

wherein A is an unsubstituted alkylene chain to 2 to 3 carbon atoms, and $R^1$ to $R^4$ are alkyl groups containing an average carbon atom content of 4 to 10 carton atoms, with the proviso that the sum of the carbon atoms of $R^1$ to $R^4$ does not exceed 40.

4. The ester of the formula of claim 3 in which A is a trimethylene chain.

5. The ester of the formula of claim 3, wherein A is an unsubstituted alkylene chain of 2 to 3 carbon atoms, and $R^1$ to $R^4$ are each one, taken individually, alkyl groups containing 6 to 10 carbon atoms, with the proviso that the sum of the carbon atoms of $R^1$ to $R^4$ does not exceed 40 carbon atoms.

6. Tetra(2-ethylhexyl)cyclohexanonetetrapropionate.

7. Tetra(oxooctyl)cyclohexanonetetrapropionate.

8. Tetra(2-ethylbutyl)cyclohexanonetetrapropionate.

9. Tetra(oxodecyl)cyclohexanonetetrapropionate.

10. Tetra(2-ethylhexyl)cyclopentanonetetrapropionate.

11. A resinous plasticized composition comprising (*a*) a resin selected from the group consisting of homoplymers of vinyl chloride and copolymers of vinyl chloride with an ethylenically unsaturated monomer copolymerizable therewith, said copolymers containing at least 50% by weight of vinyl chloride copolymerized therewith, and (*b*) a plasticizing amount of an ester of claim 2.

12. A resinous plasticized composition comprising (*a*) a resin selected from the group consisting of homopolymers of vinyl chloride and copolymers of vinyl chloride with an ethylenically unsaturated monomer copolymerizable therewith, said copolymers containing at least 50% by weight of vinyl chloride copolymerized therewith, and (*b*) a plasticizing amount of an ester of claim 4.

13. A resinous plasticized composition comprising (*a*) a resin selected from the group consisting of homopolymers of vinyl chloride and copolymers of vinyl chloride with an ethylenically unsaturated monomer copolymerizable therewith, said copolymers containing at least 50% by weight of vinyl chloride copolymerized therewith, and (*b*) a plasticizing amount of an ester of claim 5.

14. A resinous plasticized composition comprising (*a*) a resin selected from the group consisting of homopolymers of vinyl chloride and copolymers of vinyl chloride with an ethylenically unsaturated monomer copolymerizable therewith, said copolymers containing at least 50% by weight of vinyl chloride copolymerized therewith, and (*b*) a plasticizing amount of tetra(2-ethylhexyl)cyclohexanonetetrapropionate.

15. A resinous plasticized composition comprising (*a*) a resin selected from the group consisting of homopolymers of vinyl chloride and copolymers of vinyl chloride with an ethylenically unsaturated monomer copolymerizable therewith, said copolymers containing at least 50% by weight of vinyl chloride copolymerized therewith, and (*b*) a plasticizing amount of tetra(oxooctyl)cyclohexanonetetrapropionate.

16. A resinous plasticized composition comprising (*a*) a resin selected from the group consisting of homopolymers of vinyl chloride and copolymers of vinyl chloride with an ethylenically unsaturated monomer copolymerizable therewith, said copolymers containing at least 50% by weight of vinyl chloride copolymerized therewith, and (*b*) a plasticizing amount of tetra(oxodecyl)cyclohexanonetetrapropionate.

17. A resinous plasticized composition comprising (*a*) a vinyl chloride copolymer of at least 75% of vinyl chloride units and copolymerized therewith a maximum amount of 15% of at least 1 monomer selected from the group consisting of vinylidene chloride, vinyl acetate, diethyl fumarate, methyl acrylate, and vinylisobutyl ether, and (*b*) a plasticizing amount of an ester of claim 2.

No references cited.